United States Patent [19]

Emura et al.

[11] Patent Number: 4,708,303

[45] Date of Patent: Nov. 24, 1987

[54] DRAG CONTROL MECHANISM FOR USE IN FISHING REELS

[75] Inventors: Masaharu Emura; Haruo Uetsuki; Atsuhito Aoki; Takehiro Kobayashi, all of Fuchu, Japan

[73] Assignee: Ryobi Limited, Hiroshima, Japan

[21] Appl. No.: 819,143

[22] Filed: Jan. 15, 1986

[30] Foreign Application Priority Data

Jan. 16, 1985 [JP] Japan .................................. 60-4805[U]
Jan. 21, 1985 [JP] Japan .................................. 60-7030[U]
Nov. 28, 1985 [JP] Japan .......................... 60-184215[U]

[51] Int. Cl.$^4$ ............................................. A01K 89/02
[52] U.S. Cl. ...................................... 242/218; 242/219
[58] Field of Search ......................... 242/218, 219, 220

[56] References Cited

U.S. PATENT DOCUMENTS

| | | | |
|---|---|---|---|
| 2,648,506 | 8/1953 | Kirby | 242/218 |
| 2,922,595 | 1/1960 | Holahan | 242/218 |
| 2,925,964 | 2/1960 | Holahan | 242/218 |
| 4,222,537 | 9/1980 | Noda | 242/212 |
| 4,474,339 | 10/1984 | Sato | 242/84.1 R |

Primary Examiner—Billy S. Taylor
Attorney, Agent, or Firm—Frishauf, Holtz, Goodman & Woodward

[57] ABSTRACT

A drag control mechanism for use in a fishing reel of the type wherein a drag mechanism is mounted on a handle shaft to apply a drag force against a master gear comprises a drag control member mounted on the handle shaft, a drag pawl which engages or disengages from the drag control member, a reverse rotation preventing pawl which engages the ratchet wheel and a drag switch swingable between its ON and OFF states. When the drag switch is in its ON state, the drag pawl engages the drag control member to prevent the rotation thereof and the reverse rotation pawl disengages from the ratchet wheel to permit the reverse rotation of the shaft, so that the drag force of the drag mechanism is controlled by the movement of the drag control member relative to the shaft upon the rotation of the handle. When the drag switch is in its OFF state, the drag pawl disengages from the drag control member to permit its rotation with the shaft and the reverse rotation preventing pawl re-engages the ratchet wheel to prevent the reverse rotation of the shaft.

23 Claims, 16 Drawing Figures

DRAG CONTROL MECHANISM FOR USE IN FISHING REELS

BACKGROUND OF THE INVENTION

This invention relates to a drag control mechanism for use in a fishing reel of the type wherein a drag mechanism is mounted on a handle shaft to apply a drag force against a master gear.

In the prior drag control mechanism of this type, as disclosed in U.S. Pat. Nos. 4,222,537 and 4,474,339, a star-shaped drag handle is arranged on the handle shaft near the handle mounting end and the drag handle is rotated to adjust the drag force, so that the operation of the drag handle is obstructed by a handle arm. Thus, it is difficult to smoothly and rapidly adjust a drag force in response to the bite of a fish, and further, the operator's fingers are clamped between the handle arm and the drag handle as the drag handle rotates together with the handle arm.

SUMMARY OF THE INVENTION

It is, therefore, an object of the invention to provide an improved drag control mechanism for use in a fishing reel of the type wherein a drag mechanism is mounted on a handle shaft, which is capable of smoothly and rapidly adjusting the drag force in response to the bite of a fish.

For this prupose, a drag control mechanism for use in a fishing reel comprises a reel body, a handle, a shaft rotated by said handle, a master gear rotatably mounted on said shaft, a spool rotated upon rotation of said master gear, a drag mechanism mounted on said shaft to apply a drag force against said master gear, and a ratchet wheel secured to said shaft. According to the invention, the drag mechanism control member mounted on said shaft, a drag pawl rotatably mounted on said reel body to engage or disengage from said drag control member, a reverse rotation preventing pawl mounted on said reel body to engage or disengage from said ratchet wheel, a drag switch mounted on said reel body swingably between its ON and OFF states, said drag pawl engaging said drag control member to prevent the rotation thereof and said reverse rotation pawl disengaging from said ratchet wheel to permit the reverse rotation of said shaft when said drag switch is in its ON state so that the drag force of said drag mechanism is controlled by the movement of said drag control member relative to said shaft upon the rotation of said handle, and said drag pawl disengaging from said drag control member to permit its rotation with said shaft and said reverse rotation preventing pawl re-engaging said ratchet wheel to prevent the reverse rotation of said shaft when said drag switch is in its OFF state.

DESCRIPTION OF PREFERRED EMBODIMENTS

Figure 1:
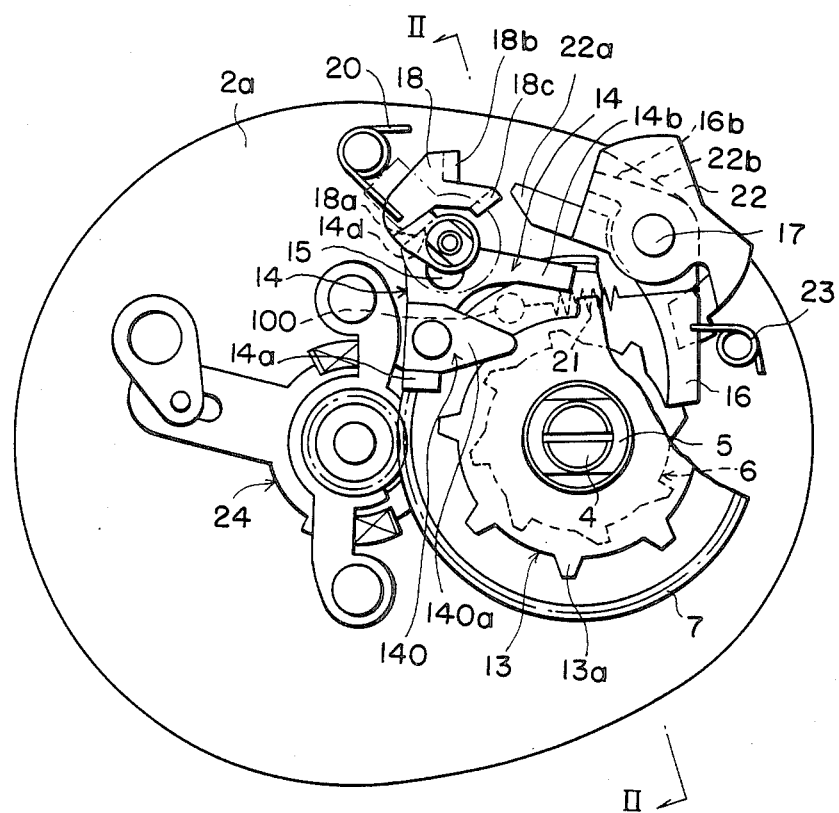
FIG. 1 is a front view of one embodiment of the drag control mechanism for use in a fishing reel according to this invention in its OFF state.
Figure 2:
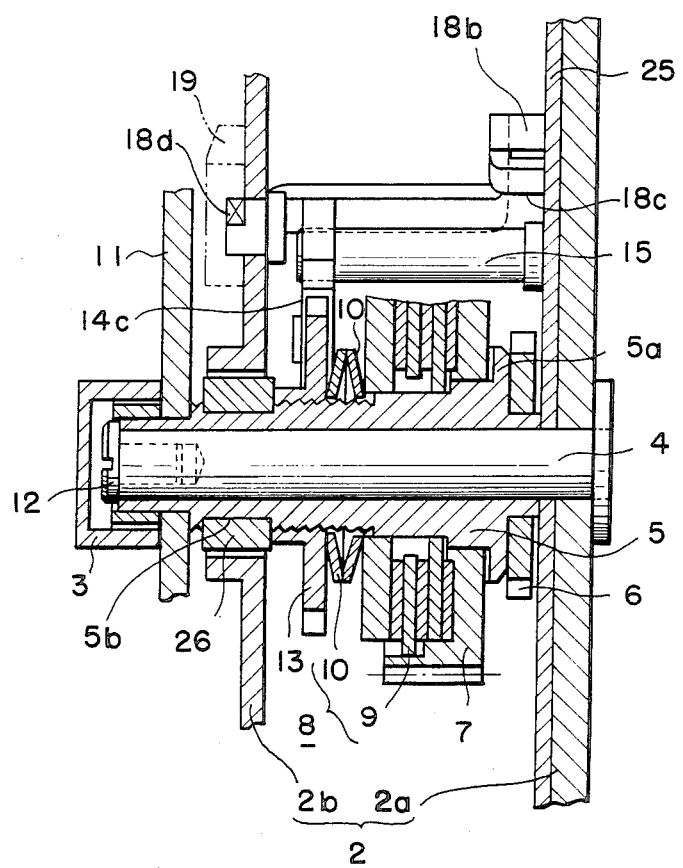
FIG. 2 is a sectional view thereof taken along a line II—II in FIG. 1.
Figure 3:
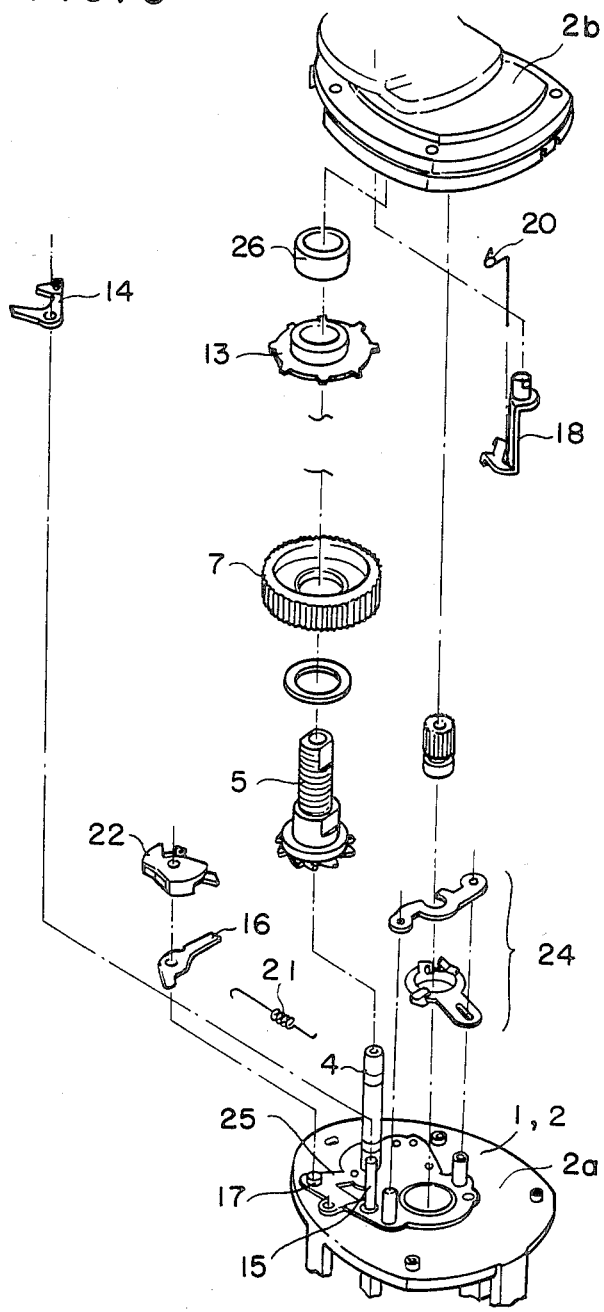
FIG. 3 is an exploded perspective view thereof.

In a fishing reel illustrated in FIGS. 1 through 5, a handle shaft 5 is rotatably mounted on a main shaft 4 extending between a side plate 2a and a cover plate 2b of one of a pair of side frames 2 (see FIG. 2). One end of the shaft 4 is fixed to the side plate 2a and the sliding of the handle shaft 5 relative to the shaft 4 is prevented by a screw 12 and a base plate 25 which is secured to the side plate 2a.

Near the base end of the handle shaft 5, is provided a flange 5a. A ratchet wheel 6 is secured to the handle shaft 5 between the flange 5a and the base plate 25. Adjacent the flange 5a, a master gear 7 and a drag mechanism 8 are mounted.

The drag mechanism 8 comprises a plurality of drag washers 9... and a pair of spring washers 10,10 slidably mounted on the handle shaft 5 between the master gear 7 and a drag control member 13 which is rotatably mounted on the handle shaft 5. Some of the drag washers 9 are prevented from relatively rotating with respect to the handle shaft 5 while the other drag washers 9 are prevented from relatively rotating with respect to the master gear 7. By forwardly or rearwardly turning the drag control member 13, the frictional force generated between the drag washers 9 and the force applied on the master gear 7 to press it against the flange 5a of the handle shaft 5 are varied, thereby the drag force is adjusted. At the other end of the handle shaft 5 which is protruded out of the cover plate 2b, a handle 11 is mounted.

The drag control member 13 is threaded on the handle shaft 5 and is formed as a ratchet wheel. A collar 26 is attached on the handle shaft 5 adjacent the drag control member 13 to prevent the sliding movement of the drag control member 13 to a certain extent.

Figure 4:
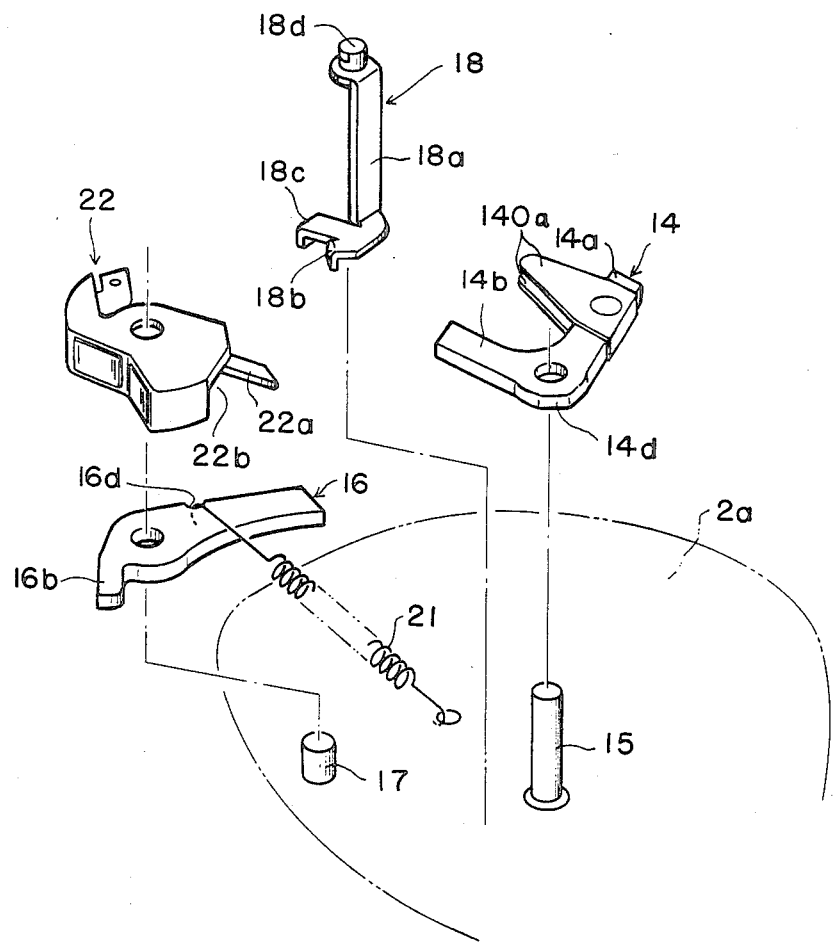
FIG. 4 is an enlarged exploded perspective view showing essential elements thereof.

A drag pawl 14 which is engagable with the drag control member 13 is rotatably mounted on a pawl shaft 15 and a reverse rotation preventing pawl 16 which is engagable with the ratchet wheel 6 is rotatably mounted on a shaft 17 (see FIGS. 1 and 4). The drag pawl 14 is L-shaped to have a pair of pawl legs 14a, 14b which selectively engage a plurality of teeth 13a provided on the outer periphery of the drag control member 13 at predetermined intervals. A clip member 140 which comprises a pair of upper and lower flaps 140a, 140a is secured to the pawl leg 14a to clip the drag control member 13 between the flaps 140a, 140a so that the drag pawl 14 is swung about the shaft 15 upon the rotation of the drag control member 13 by the frictional force generated between the clip member 140 and the drag control member 13.

A drag switch lever 18 is rotatably mounted on the cover plate 2b (see FIGS. 1, 2 and 4). The one end portion 18b of the drag switch 18 is protruded out of the cover plate 2b and a knob 19 is secured to the end portion 18d. At the other end of the drag switch 18, a pair of contact portions 18b, 18c are formed. The leg portion 18a extends between the end portion 18d and the contact portions 18b,18c so as to engage the central portion 14d of the drag pawl 14 to hold it at its neutral position where any one of pawl legs 14a,14b does not engage the drag control member 13.

The reverse rotation preventing pawl 16 is biased to rotate in the clockwise-direction in FIG. 1 by a spring 21, one end of which is hooked to the notch 16d formed on the pawl 16 while the other end is hooked to a boss 100 of the base plate 25. A pawl switch 22 is rotatably mounted on the shaft 17 coaxially with the pawl 16 and biased selectively to its ON and OFF states by a torsion spring 23. The pawl 16 is forced to rotate in the counter-clockwise direction in FIG. 1 against the biasing force of the spring 21 by the contact between the inner surface 22b of the switch 22 and the outer surface 16b of the pawl 16 when the switch is manually pushed to rotate in the counter-clockwise direction in FIG. 1.

The switch 22 is provided with a projected leg 22a which is contactable with the contact portion 18b of the drag switch 18 to be rotated in the counter-clockwise direction in FIG. 1 when the switch 18 is rotated in the clockwise direction so that the pawl 16 is forced to be disengaged from the ratchet wheel 6. Leg 22a is also contactable with the contact portion 18c of the drag switch 18 to be rotated in the clockwise direction when the switch 18 is rotated in the counter-clockwise direction in FIG. 5 so that the pawl 16 is rotated in the clockwise direction by the biasing force of the spring 21 to re-engage the ratchet wheel 6. In FIG. 1, the reference numberal 24 indicates a clutch mechanism.

The above constructed mechanism operates as follows. In the state illustrated in FIG. 1, the drag pawl 14 stands in its neutral position where it does not engage the drag control member 13 as the leg portion 18a of the drag switch 18 contacts the central portion 14d of the drag pawl 14. On the other hand, the reverse rotation preventing pawl 16 engages the ratchet wheel 6 so as to prevent the reverse rotation of the handle shaft 5. Accordingly, the forward rotation of the handle arm 11 is permitted and transmitted to a spool, not shown, via the handle shaft 5 and the master gear 7 so as to wind a fishing line, also not shown. In this condition, the drag control member 13 is rotated together with the handle shaft 5.

Figure 5:
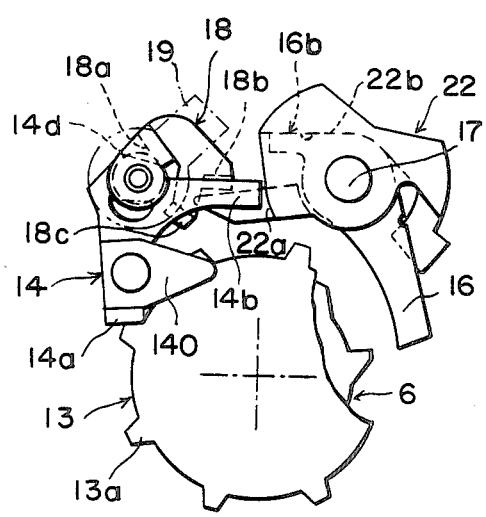
FIG. 5 is a front view thereof in its ON state.

By swinging the drag switch 18 in the clockwise direction in FIG. 1 by manually operating the knob 19 until it passes the dead point of the torsion spring 20, the drag switch 18 is automatically shifted to the position shown in FIG. 5 by the resilient force of the spring 20. At this state, the leg portion 18a of the drag switch 18 is released from contact with the central portion 14d of the drag pawl 14, so that the drag pawl 14 can freely swing around the shaft 15. Accordingly, by rotating the handle 11 in the forward direction, the pawl leg 14a of the drag pawl 14 engages the drag control member 13, while the pawl leg 14b engages the drag control member 13 by rotating the handle 11 in the reverse direction. Since the drag control member 13 is held between the clip plates 140a,140a of the clip member 140' the drag pawl 14 is rotated by the frictional force generated between the drag control member 13 and the member 140. Thus, the rotation of the drag control member 13 is prevented when the handle 11 is rotated.

By further rotating the handle 11 after the drag pawl 14 engages the drag control member 13, i.e., in FIG. 5, the drag control member 13 is relatively moved forwardly or rearwardly with respect to the handle shaft 5 depending upon the direction of the rotation of the handle 11. Thereby the drag force of the drag mechanism 8 is adjusted.

In the state illustrated in FIG. 5, as the contact portion 18b rotates the leg 22a of the switch 22, the reverse rotation preventing pawl 16 is disengaged from the ratchet wheel 6. Therefore, the handle shaft 5 can be rotated in both the forward and reverse directions.

After finishing the drag force control operation, by rotating the drag switch 18 by the knob 19 from the position shown in FIG. 5 to that in FIG. 1, the leg portion 18a again contacts the central portion 14a of the drag pawl 14 to rotate and hold it in its neutral position. Thus, the drag control member 13 again rotates together with the handle shaft 5. Further, the contact portion 18c of the switch 18 pushes the leg 22a of the switch 22 to rotate it to its original position, and thus the pawl 16 is returned to the position by the biasing force of the spring 21 where it again engages the ratchet wheel 6.

It should be noted that, in the state illustrated in FIG. 1, when the leg 22a of the switch 22 is out of the contact area of the contact portion 18c of the drag switch 18, the pawl switch 22 can be operated independently of the drag switch 18 to engage or disengage the pawl 16 with the ratchet wheel 6.

Figure 6:
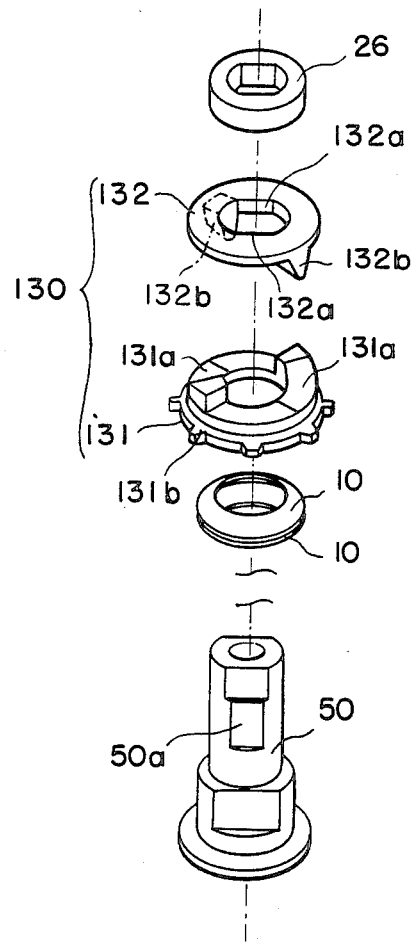
FIG. 6 is an exploded perspective view showing a modified drag control member thereof.

FIG. 6 shows the the modified embodiment of the drag control member 13. The modified drag control member 130 comprises a cam member 131 and a cam follower 132. The cam member 131 is rotatably and slidably mounted on the handle shaft 50 and is provided with a pair of inclined cam surfaces 131a,131a on one side surface thereof and a plurality of teeth 131b on the peripheral surface thereof. The cam follower 132 is mounted on the handle shaft 50 in such manner that the relative rotation is prevented by the engagement of the notch 50a,50a of the handle shaft 50 with a pair of the straight portions 132a,132a of the central hole of the cam follower 132. The upward sliding in FIG. 6 of the cam follower 132 is prevented by the collar 26. The cam follower 132 is provided with a pair of projections 132b, 132b on one side surface thereof which contact the inclined cam surfaces 131a,131a of the cam member 131.

When the handle 11 is rotated while the rotation of the cam member 131 is prevented by the engagement of the drag pawl 14 therewith, the projections 132b,132b of the cam follower 132 which rotates together with the handle shaft 50 relatively slide along the inclined cam surfaces 131a,131a of the cam member 131 so that the cam member 131 moves along the handle shaft 50 in the forward or rearward directions depending upon the direction of the rotation of the handle 11. Thus, the drag force of the drag mechanism 8 is adjusted.

When the drag pawl 14 is disengeged from the cam member 131, the cam member 131 and the cam follower 132 rotate together with the handle shaft 50.

FIGS. 7 through 10 show another embodiment of this invention. In this embodiment, a handle 210 is detachably connected to one end of a traverse-cam shaft (handle shaft) 203 by a bolt 209, and the handle 210 is able to be connected to the other end, not shown, of the traverse-cam shaft 203. Further, the rotation of the handle 210 is transmitted to a spool shaft 223 via a master gear 206 and intermediate gears 224a,224b.

Adjacent the master gear 206, a drag mechanism 207, a drag control member 207, and a drag control member 214 are arranged. The drag mechanism 207 comprises a pair of drag washers 207a,207a and a pair of spring washers 207b,207b. One of the drag washers 207a is prevented to relatively rotate with respect to the handle shaft 5 while the other one is prevented from relatively rotating with respect to the master gear 7. On the outer periphery of the drag control member 214, a drag ratchet 212 is secured, and a ratchet wheel 205 is fixed on the traverse-cam shaft 203.

A drag pawl 216 and a reverse rotation preventing pawl 217 are, in this embodiment, coaxially mounted on a pawl shaft 215. The drag pawl 216 is provided with a pawl leg 216a and a projection 216b extending in the crossing direction of the leg 216a, and is biased to rotate in the counter-clockwise direction in FIG. 7 to mesh with the drag ratchet 212 by a spring 218 wound about a cylindrical boss 216c of the pawl 216 and one end of which is secured to a side plate 201a while the other end is hooked to the pawl leg 216a of the pawl 216.

The reverse rotation preventing pawl 217 is provided with a pawl leg 217a and a projection 217b extending in the opposite direction of the leg 217a. A clip member 250 comprising a pair of upper and lower flaps 250a,250a is secured to the pawl leg 217a so as to clip the ratchet wheel 205 between the flaps 250a,250a.

A drag switch 219 is rotatably mounted on a shaft 220 and selectively biased to rotate to its ON and OFF states by a torsion spring 221, one end of which is secured to the side plate 201a while the other end is secured to the drag switch 219. The drag switch 219 is provided with a recess 219c having an inner vertical wall 219b, wherein the projection 217b of the pawl 217 can be positioned, and an upward protrusion 219a contacts the projection 219a which contacts the projection 216b of the pawl 216.

The above constructed mechanism operates as follows. In the state illustrated in FIG. 7, the drag switch 219 is in its OFF state. In this state, the protrusion 219a thereof contacts the projection 216b of the drag pawl 216 to prevent the rotation of the drag pawl 216 in the counter-clockwise direction against the biasing force of the spring 218. Thus the drag pawl 216 is held at its neutral position where the pawl leg 216a does not mesh with the drag ratchet 212. Further, the pawl leg 217a of the anti-reverse rotation preventing pawl 217 meshes with the ratchet wheel 205.

Figure 10:
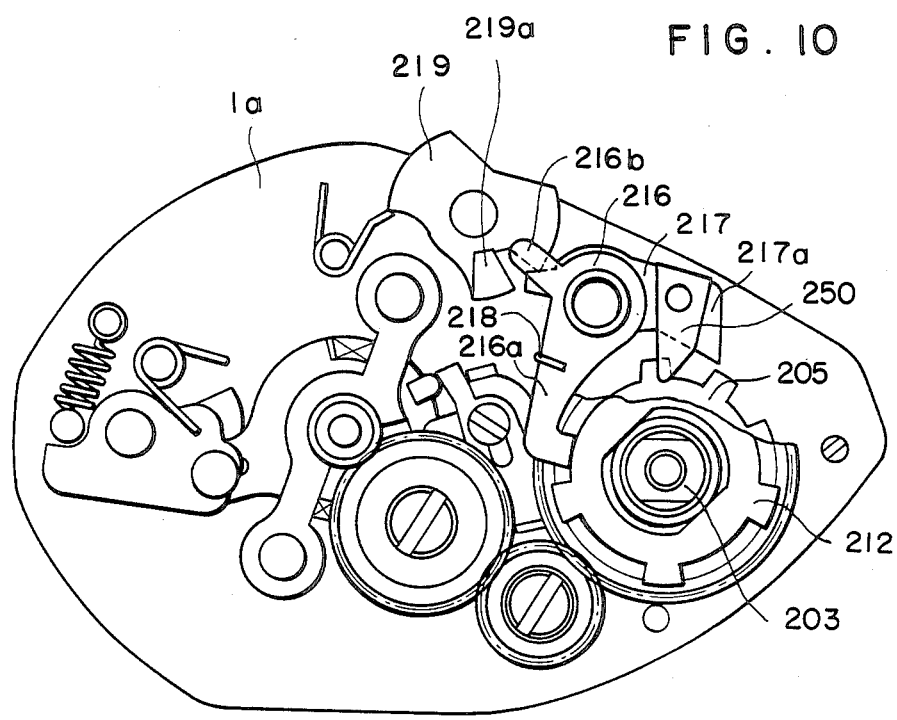
FIG. 10 is a front view thereof in its ON state.

By manually pushing the drag switch 219 to rotate in the direction of the arrow x until it passes the dead point of the spring 221, the drag switch 219 is then automatically rotated by the resilient force of the spring 221 to its ON state illustrated in FIG. 10. At this time, as the wall 219b of the recess 219c of the drag switch 219 pushes the projection 217b of the pawl 217 so as to rotate the pawl 217 in the counter clockwise direction, the pawl 217 disengages from the ratchet wheel 205. Thus, the traverse-cam shaft 203 can rotate both in the forward and reverse directions. Further, as the protrusion 219a is rotated in the clockwise direction, the drag pawl 219 also rotates in the same direction by the biasing force of the spring 218 until it meshes with the drag ratchet 212. Thus, the rotation of the drag ratchet 212 is prevented.

Under the state illustrated in FIG. 10, by rotating the handle 210, the traverse-cam shaft 203 rotates while the drag control member 212 is prevented from rotating. Therefore, the drag control member 212 is threaded into forward or rearward directions relative to the traverse-cam shaft 203. With the forward movement of the member 212, the drag force of the drag mechanism 207 is increased, while it decreases with the rearward movement of the member 212. Thus, the drag force is controlled and adjusted.

Figure 7:
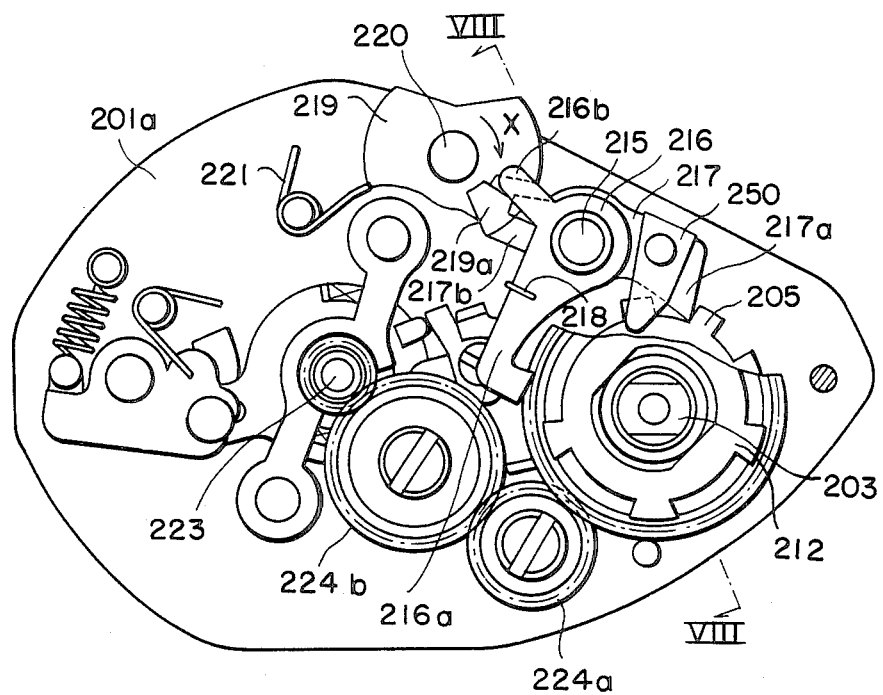
FIG. 7 is a front view of another embodiment of the drag control mechanism in its OFF state.
Figure 8:
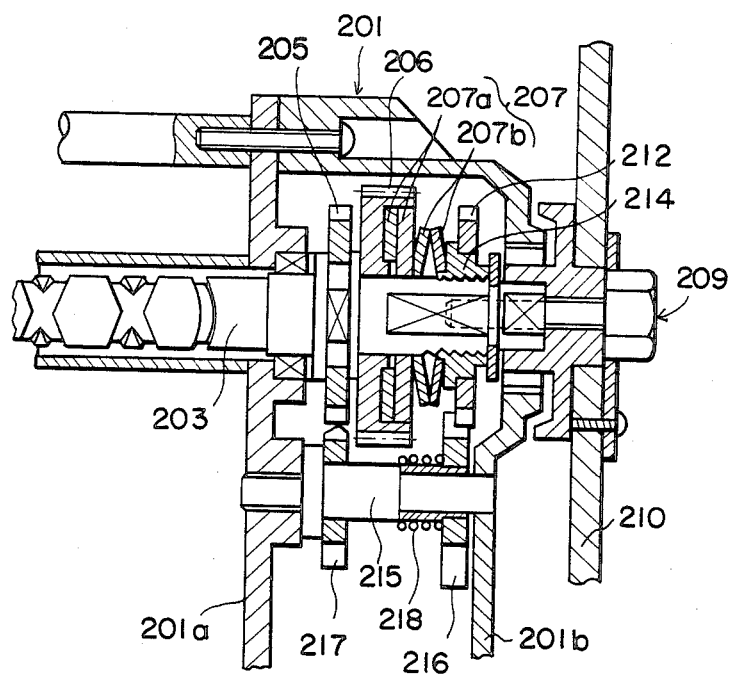
FIG. 8 is a sectional view thereof taken along a line VIII—VIII in FIG. 7.
Figure 9:
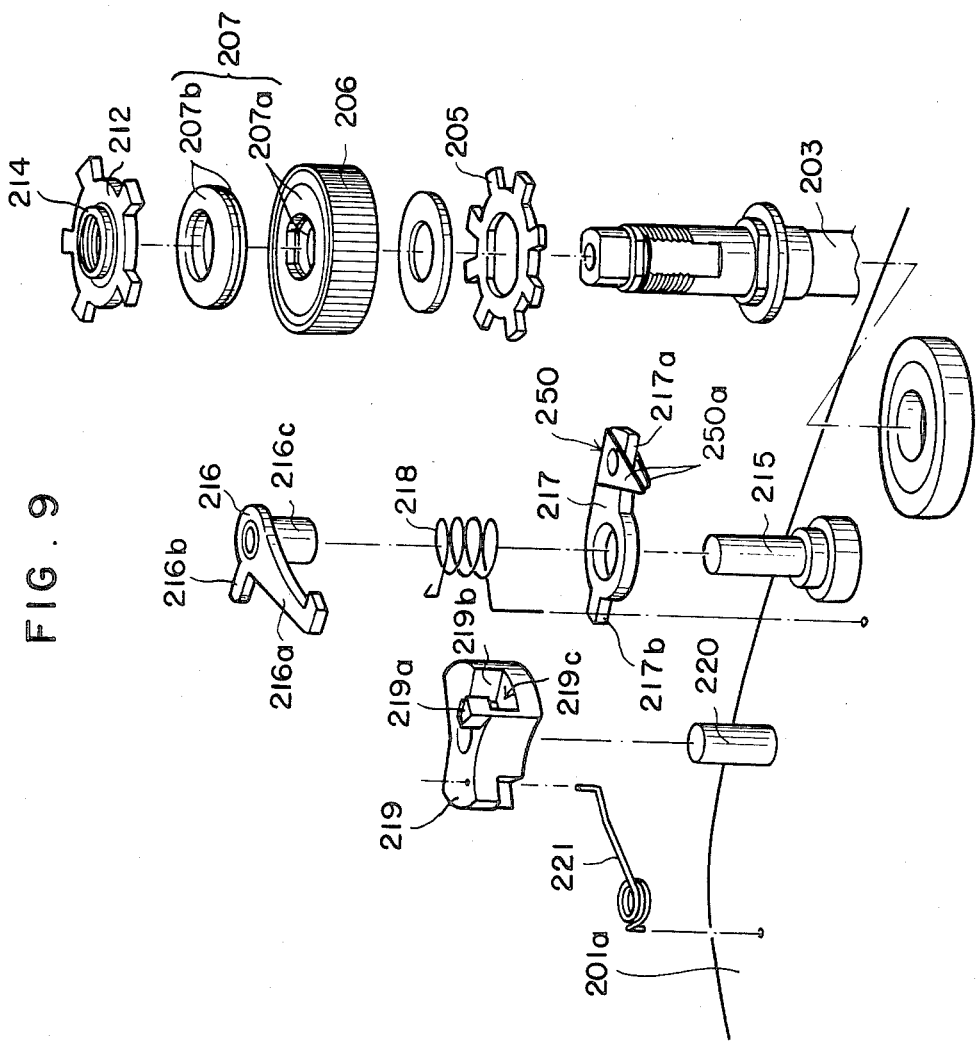
FIG. 9 is an exploded perspective view showing essential elements thereof.

After the adjustment of the drag force is accomplished, by manually shifting the drag switch 219 to its OFF state illustrated in FIG. 7, the drag pawl 216 is disengaged from the drag ratchet 212 so as to allow the drag control member 212 to rotate together with the traverse-cam shaft 203 as the protrusion 219a of the switch 219 pushes the projection 216b of the pawl 216. Further, the pawl 217 is prepared to reengage the ratchet wheel 205 so as to prevent the reverse rotation of the traverse-cam shaft 203, as the contact of the wall 219b of the switch 219 with the projection 217b of the pawl 217 is released, and the pawl 217 is rotated in the clockwise-direction in FIG. 10 by the frictional force generated between the clip member 250 and the wheel 205 where the handle 210 is rotated in the reverse direction.

Figure 11:
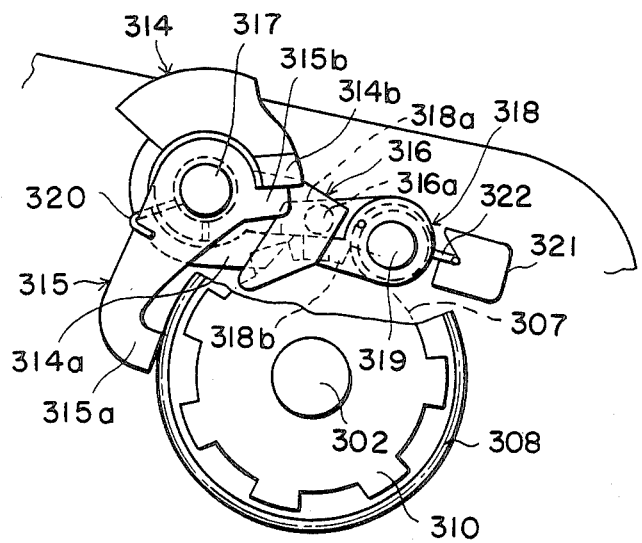
FIG. 11 is a front view of still another embodiment of the drag control mechanism in its OFF state.
Figure 12:
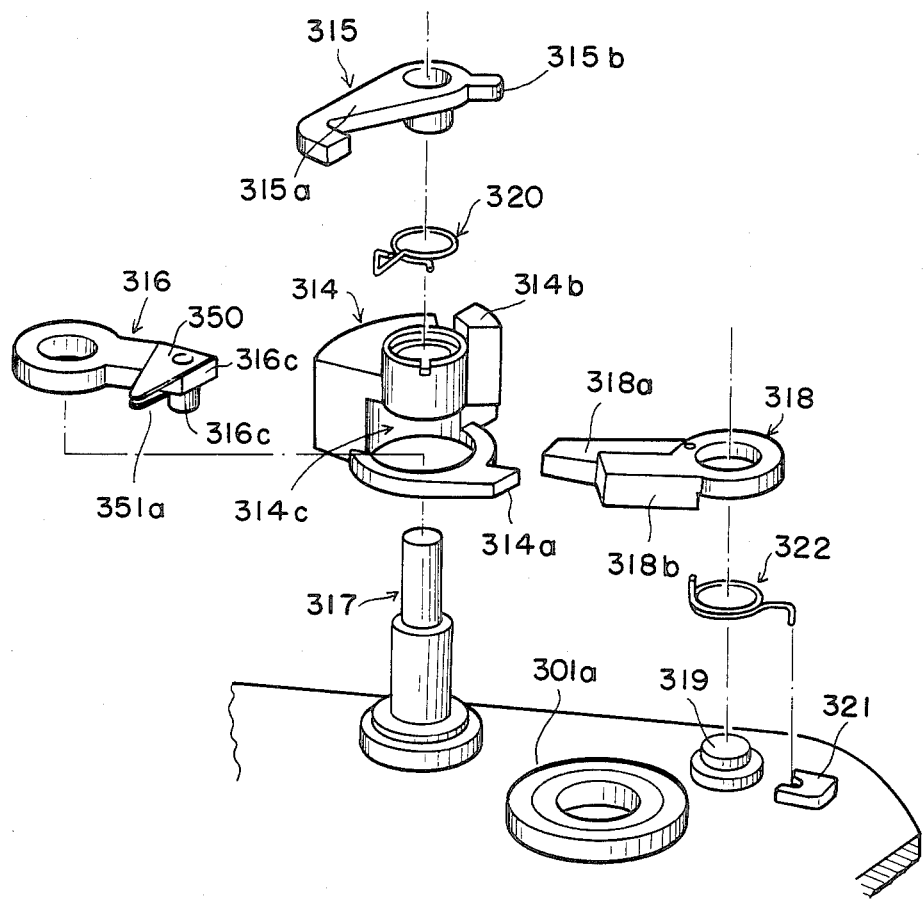
FIG. 12 is an exploded perspective view showing essential elements thereof.
Figure 13:
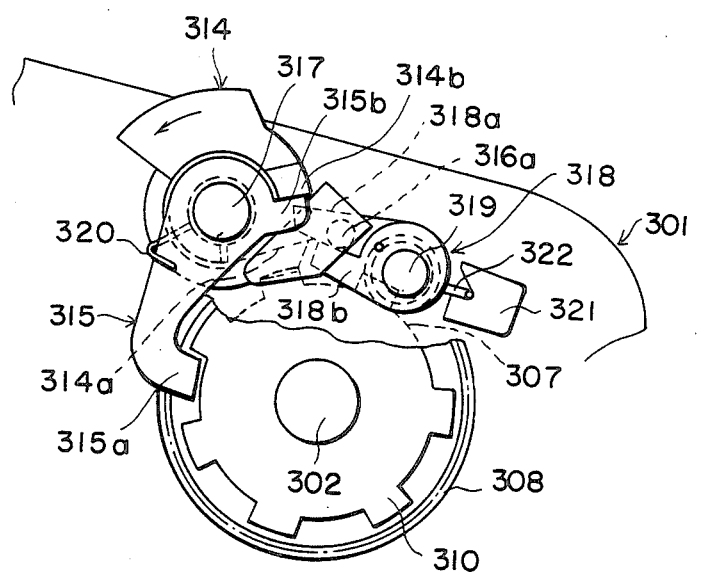
FIG. 13 is a front view thereof in its ON state.

FIGS. 11 through 13 show another embodiment of this invention. In this embodiment, a drag switch 314, a drag pawl 315 and a reverse rotation preventing pawl 316 are all rotatably mounted co-axially on a pawl shaft 317, and an operation lever 318 is rotatably mounted on a boss 319.

The drag switch 314 is provided with a projection 314a at the lower side thereof and a side contact portion 314b at the upper side thereof, and a spacing 314c is formed therebetween where the pawl 316 is inserted.

The drag pawl 315 is provided with a pawl leg 315a and a projection 315b, and is biased to rotate in the direction for the pawl leg 315a to mesh with the drag ratchet 310 by a spring 320, one end of which is secured to the drag switch 314 while the other end is hooked to the pawl leg 315a. The projection 315b is formed to contact the side contact portion 314b of the drag switch 314 while the leg 315a is to mesh with the drag ratchet 310.

The reverse rotation preventing pawl 316 is provided with a downwardly extending boss 316a at the front end of a pawl leg 316c and a clip member 350 which comprises a pair of upper and lower flaps 350a,350a to clip the ratchet wheel 307 therebetween.

The operation lever 318 is provided with a pair of contact legs 318a and 318b, and is biased to rotate in the counter-clockwise direction in FIG. 11 by a spring 322, one end of which is hooked to a hook member 321 while the other end is secured to the lever 318. The leg 318a is formed to contact the projection 314a of the drag switch 314 while the leg 318b is formed to contact the boss 316a of the pawl 316.

As the operating lever 318 is biased to rotate in the counter-clockwise direction in FIG. 11, the contact leg 318a pushes the projection 314a of the drag knob 314 to hold the knob 314 in its OFF state. At this state, the side contact portion 314b of the drag switch 314 pushes the drag pawl 315 in the direction to disengage from the drag ratchet 310 against the biasing force of the spring 320. Further, the leg 316c of the pawl 316 is formed to mesh with the ratchet wheel 307 upon the counter-clockwise rotation of the wheel 307 as the pawl 316 is rotated in the clockwise direction by the frictional force between the clip member 350 and the wheel 307.

The above constructed mechanism operates as follows. By manually pushing the drag switch 314 into its ON state, the projection 314a thereof moves in the counter-clockwise direction in FIG. 11 and the lever 318 is rotated in the clockwise direction against the biasing force of the spring 322 as the projection 314a urges the leg 318a. Then, the leg 318b of the lever 318 pushes the boss 316a of the pawl 316 to rotate in the counter-clockwise direction and the pawl leg 316c disengages from the ratchet wheel 307. Further, as the side contact portion 314b of the drag switch 314 rotates in the counter-clockwise direction, the pawl 315 rotates to mesh with the drag ratchet 310 by the biasing force of the spring 320. Thus, the mechanism is shifted to its ON state as illustrated in FIG. 13.

At this ON state, as the rotation of the drag ratchet 310 is prevented by the engagement with the drag pawl 315, the drag ratchet 310 moves forwardly or rearwardly so as to press or depress the drag mechanism 309 by rotating the handle 305, and thereby the drag force is adjustable.

After finishing the adjustment of the drag force, by depressing the drag switch 314, the operating lever 318 is rotated in the counter clockwise direction in FIG. 13 by the biasing force of the spring 322 and the leg 318a pushes the portion 314a of the drag switch 314 to rotate to its OFF position. Further, as the portion 314b of the drag switch 314 urges the projection 315b of the drag pawl 315 to rotate in the clockwise direction against the biasing force of the spring 320, the drag pawl 315 is disengaged from the drag ratchet 310. Thus, the drag ratchet is again formed to rotate together with the traverse-cam shaft 302. At this time, as the boss 316a of the pawl 316 is disengaged from the leg 318b of the lever 318, the pawl 316 is formed to re-engage the ratchet wheel 307. Thus, the reverse rotation of the traverse-cam shaft 302 is prevented.

Figure 14:
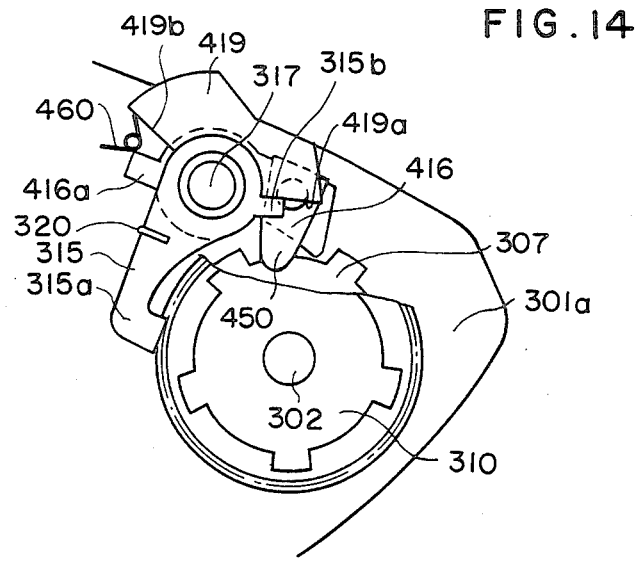
FIG. 14 is a front view of another embodiment of the drag control mechanism in its OFF state.
Figure 16:
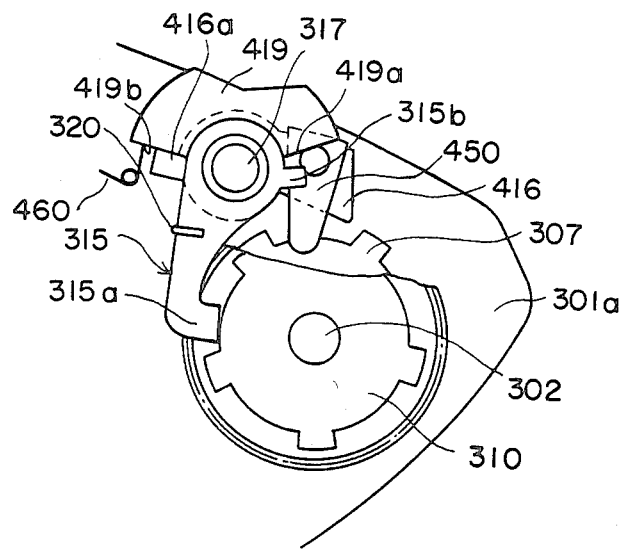
FIG. 16 is a front view thereof in its ON state.
Figure 15:
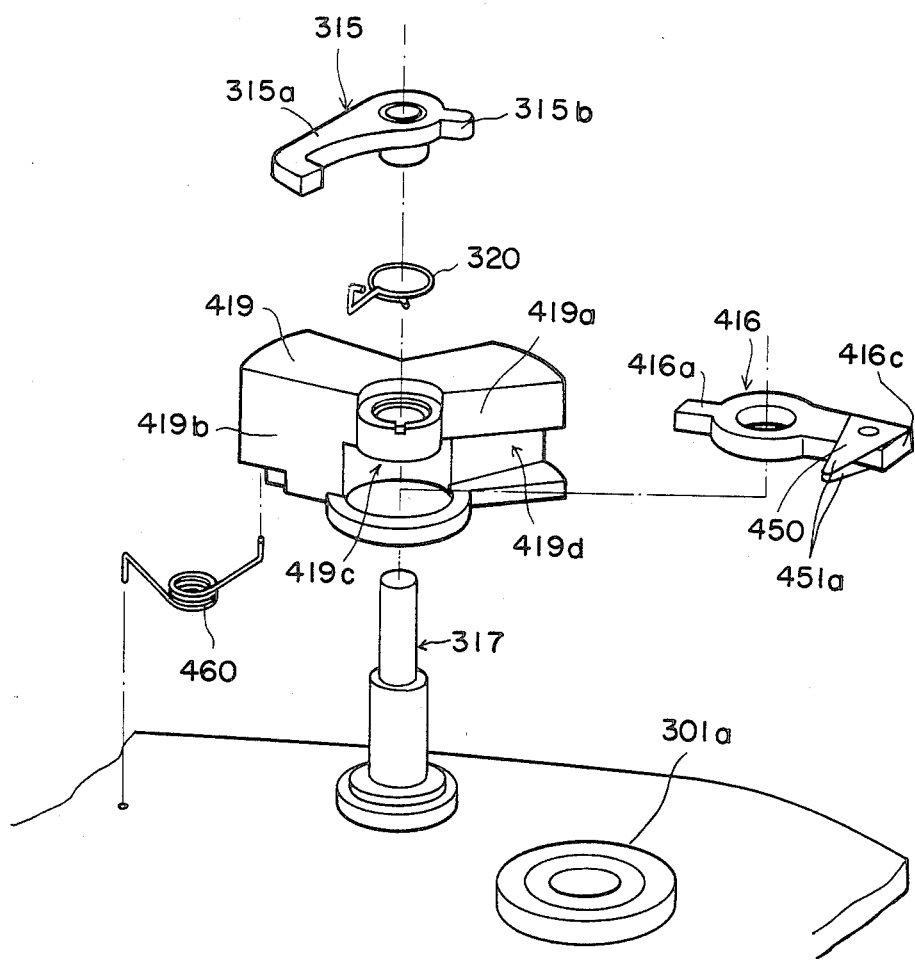
FIG. 15 is an exploded perspective view showing essential elements thereof.

FIGS. 14 through 16 show still another embodiment of the invention. This embodiment is basically identical with the embodiment illustrated in FIGS. 11 through 13, except that a drag switch 419 and a reverse rotation preventing pawl 416 are modified and that a torsion spring 460 is provided instead of the operating lever 318.

The modified drag switch 419 is biased to rotate selectively toward its ON and OFF state by a torsion spring 450. The drag switch 419 is provided with a spacing 419c where the base portion of the modified pawl 416 is positioned. At one side of the drag switch 419, a recess 419d and an upper side wall 419a are formed. At the other side of the drag switch 419, a contact wall 419b is formed. The wall 419a is formed to contact the projection 315b of the pawl 315.

The modified pawl 416 is, instead of the boss 316a, provided with a projection 416a extending in the opposite direction of the pawl leg 416c. The projection 416a is formed to contact the wall 419b of the drag switch 419 while the pawl leg 416c is formed to contact the wall 419e.

The above modified mechanism operates as follows. In the state illustrated in FIG. 14, the drag switch 419 is in its OFF state. In this state, the wall 419a urges the projection 315b of the pawl 315 to the position where the pawl 315 does not mesh with the drag ratchet 310 against the biasing force of the spring 320. Further, the pawl 416 is formed to mesh with the ratchet wheel 307.

By manually rotating the drag switch 419 in the counter-clockwise direction in FIG. 14, the wall 419b pushes the projection 416a of the pawl 416 to rotate it in the same direction so that the pawl leg 416c is released from the ratchet wheel 307. Further, the urging force applied to the projection 315b of the pawl 315 by the wall 419a is released, and the pawl 315 is rotated in the counter-clockwise direction by the biasing force of the spring 320 so that the pawl leg 315a meshes with the drag ratchet 310. Thus, the mechanism is shifted to its ON state as illustrated in FIG. 16 where the drag force is adjustable by rotating the handle.

By rotating the drag switch 419 in the clockwise direction in FIG. 16, the pawl 315 is returned to its OFF position by the urging force of the wall 419a, while the pawl 416 is again formed to mesh with the ratchet wheel 307 as the urging force of the wall 419b is released. Thus, the mechanism is shifted to its OFF state as illustrated in FIG. 14.

With the above explained mechanisms embodying the invention, the required operation to adjust the drag force is to rotate the handle by one hand in forward or rearward directions while pushing the drag switch by another hand. Accordingly, control of the drag force is very easy and it can be quickly done.

What is claimed is;

1. In a drag control mechanism for use in a fishing reel which comprises a reel body, a handle, a shaft coupled to said handle for rotation thereby and rotatingly mounted to said reel body, a master gear mounted on said shaft for rotation therewith, a spool rotatingly mounted on said reel body and coupled to said master gear for rotation therewith, a drag mechanism mounted on said shaft to apply a drag force against said master gear, and a ratchet wheel secured to said shaft, the improvement which comprises:

said drag mechanism including a drag control member threadedly mounted on said shaft, said drag control member being normally rotatable jointly with said handle to remain at a given distance along the length of said shaft from the master gear, said drag control member being movable to another distance along the shaft relative to the master gear when rotation of the drag control member jointly with said handle is blocked;

a drag pawl rotatably mounted on said reel body and selectively engageable with or disengageable from said drag control member;

a reverse rotation preventing pawl mounted on said reel body and selectively engageable with or disengageable from said ratchet wheel;

a drag switch means mounted on said reel body and being swingable between an ON position and an OFF position, said drag switch means being couplable to the drag pawl and the reverse rotation preventing pawl;

said drag switch means being operable when at the ON position for placing said drag pawl in engagement with said drag control member to prevent the rotation thereof and for disengaging said reverse rotation preventing pawl from said ratchet wheel to permit reverse rotation of said shaft for controlling the drag force of said drag mechanism by the movement of said drag control member along said shaft upon the rotation of said handle; and said drag switch means being operable when at the OFF position for disengaging said drag pawl from said drag control member to permit its rotation with said shaft and for re-engaging said reverse rotation preventing pawl with said ratchet wheel to prevent the reverse rotation of said shaft.

2. The mechanism according to claim 1 wherein said drag control member comprises a ratchet wheel threadably mounted on said shaft.

3. The mechanism according to claim 1 wherein said drag pawl is L-shaped to have a pair of pawl legs and which selectively meshes with said drag control member to prevent the rotation thereof.

4. The mechanism according to claim 3 wherein said drag pawl is provided with a clip member to clip said drag control member so that said drag pawl is swung upon the rotation of said drag control member.

5. The mechanism according to claim 4 wherein said drag switch is provided with a portion to engage said drag pawl to hold said drag pawl at its neutral position where any one of said pawl legs of said drag pawl does not mesh with said drag control member.

6. The mechanism according to claim 5 wherein said drag switch is biased to rotate selectively to its ON and OFF states by a torsion spring, said drag pawl being held at its neutral position when said drag switch is at its OFF states.

7. The mechanism according to claim 5 which further comprises a pawl switch coaxially mounted with said reverse rotation preventing pawl, and wherein said reverse rotation preventing pawl is biased to rotate to mesh with said ratchet wheel while said pawl switch is selectively biased to its ON and OFF states by a torsion spring, said pawl being rotated to be released from said ratchet wheel against the biasing force of said spring when said pawl switch is rotated to its OFF state.

8. The mechanism according to claim 7 wherein said drag switch is provided with a pair of contact portions, and said pawl switch provided with a projected leg which is selectively contacted by said contact portions of said drag switch to be rotated to its ON and OFF states, thereby, upon rotation of said pawl switch, said reverse rotation preventing pawl being rotated to mesh with or be released from said ratchet wheel.

9. The mechanism according to claim 8 wherein said pawl switch is independently operatable when said drag switch stands at its OFF position.

10. The mechanism according to claim 1 wherein said drag pawl and said reverse rotation preventing pawl are coaxially mounted, and said drag switch is selectively biased to rotate to its ON and OFF positions by a torsion spring.

11. The mechanism according to claim 10 wherein said drag pawl is biased to rotate in the direction to engage said drag control member, and is provided with a projection to be pushed by said drag switch to rotate in the direction to disengage from said drag control member against the spring biasing force when said drag switch is shifted to its OFF state.

12. The mechanism according to claim 11 wherein said reverse rotation preventing pawl is provided with a clip member to clip said ratchet wheel so that said pawl is swung in the direction to engage said ratchet wheel upon the reverse rotation of said ratchet wheel, and a projection which is pushed by said drag switch to rotate in the direction to disengage from said ratchet wheel so as to allow the reverse rotation of said ratchet wheel when said drag switch is shifted to its ON state.

13. The mechanism according to claim 1 further comprising a spring coupled to an operating lever connected to said drag switch means, wherein said drag switch means, said drag pawl and said reverse rotation preventing pawl are coaxially mounted, and said drag switch means is urged to rotate to its OFF state by said operating lever as biased by said spring.

14. The mechanism according to claim 13 further comprising a second spring coupled to said drag pawl, wherein said drag pawl is urged by said second spring to rotate in a direction to engage said drag control member, and is provided with a projection to be urged by said drag switch means to disengage from said drag control member against a spring force of the second spring when said drag switch means is at its OFF position.

15. The mechanism according to claim 14 wherein said reverse rotation preventing pawl is provided with a clip member to clip said ratchet wheel so that said pawl is swung in the direction to engage said ratchet wheel upon the reverse rotation of said ratchet wheel.

16. The mechanism according to claim 15 wherein said operating lever is provided with a pair of contact legs, one of which is to urge said drag switch means to its OFF position while the other of which is to urge said reverse rotation preventing pawl to disengage from said ratchet wheel when said drag switch means is shifted to its ON position.

17. The mechanism according to claim 1 wherein said drag switch, said drag pawl and said reverse rotation preventing pawl are coaxially mounted, and said drag switch is selectively biased to rotate to its ON and OFF state.

18. The mechanism according to claim 17 wherein said drag pawl is spring biased to rotate in the direction to engage said drag control member, and is provided with a projection to be urged by said drag switch to disengage from said drag control member against the spring force when said drag switch is at its OFF state.

19. The mechanism according to claim 18 wherein said reverse rotation preventing pawl is provided with a clip member to clip said ratchet wheel so that said pawl is swung in the direction to engage said said ratchet wheel upon the reverse rotation of said ratchet wheel.

20. The mechanism according to claim 19 wherein said reverse rotation preventing pawl is provided with a projection to be urged by said drag switch to disengage from said ratchet wheel when said drag switch is shifted to its ON state.

21. The mechanism of claim 1 further comprising a second shaft connected to the reel body, wherein the drag pawl is rotatably mounted on said second shaft.

22. The mechanism of claim 21, wherein the axes of said shaft and the second shaft are substantially parallel.

23. The mechanism of claim 1, further comprising compressible means mounted on said shaft between the drag control member and said master gear for exerting greater drag force on said master gear as the drag control member approaches the master gear along said shaft.

* * * * *